March 9, 1965  F. J. PRICE, JR  3,172,645
AGITATOR FOR FOODS OF A LIQUID FORM CONTAINING SOLIDS
Filed July 21, 1961

INVENTOR.
FREDERICK J. PRICE, JR.
BY
Barlow & Barlow
ATTORNEYS 3,172,645
AGITATOR FOR FOODS OF A LIQUID FORM
CONTAINING SOLIDS
Frederick J. Price, Jr., Saugus, Mass., assignor to
Doryce Appleton, Stuart, Fla.
Filed July 21, 1961, Ser. No. 125,740
4 Claims. (Cl. 259—107)

This invention relates to an agitator for liquid foods in which there are suspended solids.

In the serving of foods which are largely liquid but have suspended in them some solids, an example of which may be soups containing barley, rice, beans, cubes of meat and carrots or other vegetables, it is desirable that when a food of this character is served, that there be distributed in the liquid substantially equal amounts of solids in each serving that is made from a bowl or some large container, and in order to accomplish this, the solids must be kept from settling to the bottom of the bowl.

One of the objects of this invention is to provide an agitator which will plow through the liquid and solids tending to cause upward movement of the material through which the agitator plows so as to keep substantially an equal distribution of solids and liquids throughout the entire contents in the bowl.

Another object of this invention is to provide a rotary agitator which will cause substantially the same agitation throughout the liquid through which it moves from its axial center radially outwardly so that at the location where the agitator is traveling the fastest in surface speed, it will have substantially the same action as the portion of the agitator which is moving at a slower surface speed closer to the center or axis of rotation of the agitator.

Another object of the invention is to provide an agitator which will be substantially balanced about the axis about which it rotates.

Another object of this invention is to provide an agitator which may move relatively slowly through the material which it is to agitate and yet will provide the desired mixing the solids and liquids in the bowl.

With these and other objects in view the invention consists of certain novel features of construction as will be more fully described and particularly pointed out in the appended claims.

Figure 1:
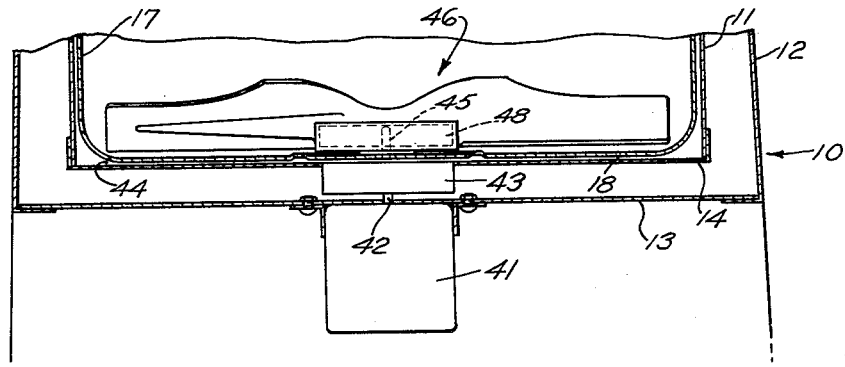
FIGURE 1 is a fragmental sectional view showing a bowl for containing the food to be agitated and also the arrangement for mounting the bowl and the agitator and its operating means.

In proceeding with this invention, I have formed an agitator to be mounted upon a vertical spindle and rotated thereabout. The agitator consists essentially of a hub portion in which there is held a magnet, which hub may be mounted close to the bottom of a bowl so as to rotate about about a vertical axis and be driven by a magnetic couple from a motor without the bowl. Blades extend radially from the hub and are inclined to the bottom of the bowl or a horizontal plane so that the leading edge of the blade as the agitator rotates will be lowest and the trailing edge higher, which means that as the blade rotates through the liquid and solid, it has sort of a plowing action to lift the solids and liquid upwardly causing the solids to be more or less suspended in the liquid as continued agitation occurs.

With reference to the drawings 10 designates generally a part of the dispenser having an inner wall 11 providing a chamber of generally cylindrical form and outer casing 12 with bottom designated generally 13 and a spaced between the walls. This chamber has a bottom wall 14. A bowl 17 is supported in this chamber having a bottom wall 18.

A motor 41 is supported on the bottom wall 14 and has a shaft 42 to drive a magnet 43 below the bottom wall 14. The bowl 17 having a bottom wall 18, usually of stainless steel or some easily cleaned material, is suspended from above to leave a small space 44 beneath the bottom 18 of the bowl and the bottom 14 of the chamber just described. A pin 45 extends upwardly from this bottom wall 18 of bowl 17, and an agitator designated generally 46 mounts upon this pin.

Figure 2:
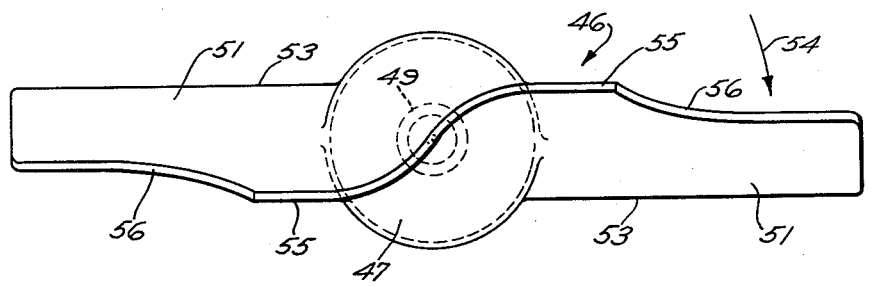
FIGURE 2 is a top plan view of the agitator alone.
Figure 3:
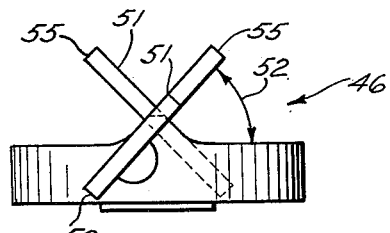
FIGURE 3 is an end view of the agitator alone.
Figure 4:
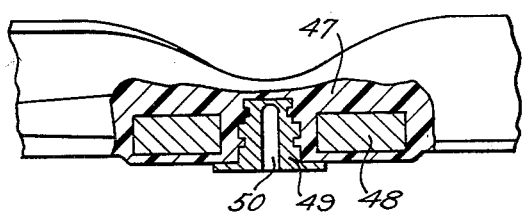
FIGURE 4 is a fragmental sectional view of the center portion of the agitator.

This agitator comprises a hub 47 which here is shown as of molded plastic within which there is a magnet 48 which will form with the magnet 43 a magnetic couple so that as the magnet 43 turns, the magnet 48 will follow it. Also there is a bushing 49 molded in this hub 47 having a recess 50 to set on to the pin 45 as a center axis about which the agitator will rotate. Blades 51 of identical form extend radially from the hub in a symmetrical relation with reference to the hub and its center. These blades are each inclined at substantially 43° to the horizontal plane as shown in FIGURE 3 as seen at 52 so that as the blade rotates, it has a plowing action through the material in the bowl 17. The leading edge of this blade is designated 53 and is lowermost as rotatation occurs clockwise as shown by arrow 54 in FIGURE 2. The trailing edge 55 is higher than the leading edge 53 as rotation occurs, and this trailing edge is cut away as at 56 (see FIGURE 2) so that the width of the blade becomes progressively less as its radius increases from the center. The amount of reduction will be such that the lifting action of the blade by reason of its increased surface speed, as its radius increases will be substantially the same throughout its radial extent so that it will have substantially the same effect of agitating or lift effect at its outer tip end as it will have near the hub.

This agitator will cause a wave motion beneath the surface and will keep the solids from settling to the bottom of the bowl, maintaining them substantially uniform throughout the depth of the bowl so that as a serving will occur throughout the time the food lasts, there will be substantially the same amount of solids in each serving when a unit volume is taken from the bowl. By this arrangement there is a controlled turbulence without suffering any grinding or crushing of the food particles which may be in the liquid. I have found that about 30 revolutions per minute is satisfactory for stirring soups and the like.

The length of the blade will vary with the bowl in which it is used, and have a rounded end where a somewhat smaller diameter bowl is utilized.

I claim:

1. An agitator for a bowl of food of liquid and solid form comprising a hub to which energy is applied for rotating the same about its axis, a blade extending radially from the hub axis in a plane at right angles to the axis of rotation of the hub, the leading face of the blade being inclined with respect to the vertical so that its trailing edge is higher than its leading edge whereby the material through which the blade passes is urged axially of the hub, said blade having a progressively reduced width as its radius from the hub increases, said reduced width being generally proportional to the circumferential movement of the blade about its axis so that the lift effect of the blade is generally the same throughout its radial extent.

2. An agitator as in claim 1 wherein there are a plurality of symmetrically arranged radially extending blades.

3. An agitator as in claim 1 wherein the inclination of the blade is about 43°.

4. In combination, a bowl for food of liquid and solid form, an agitator therein mounted for rotation about a vertical axis, having a hub, a blade extending radially from the hub axis in a plane at right angles to the axis of rotation of the hub, the leading face of the blade being inclined with respect to the vertical so that its trailing edge is higher than its leading edge whereby the material through which the blade passes is urged upwardly axially of the hub, said blade having a progressively reduced width as its radius from the hub increases, said reduced width being generally proportional to the circumferential movement of the blade about its axis so that the lift effect of the blade is generally the same throughout its radial extent.

References Cited in the file of this patent

UNITED STATES PATENTS

| | | |
|---|---|---|
| 317,769 | Hammerle | May 12, 1885 |
| 438,606 | Currier | Oct. 21, 1890 |
| 842,386 | Cook | Jan. 29, 1907 |
| 970,846 | Miller | Sept. 20, 1910 |
| 1,420,774 | Stainbrook | June 27, 1922 |
| 1,443,738 | Gibson | Jan. 30, 1923 |
| 1,450,326 | Maitland | Apr. 3, 1923 |
| 1,722,272 | Buck et al. | July 30, 1929 |
| 1,827,004 | Gibson | Oct. 13, 1931 |
| 2,167,540 | Welsh | July 25, 1939 |
| 2,501,016 | Woodman | Mar. 21, 1950 |
| 2,506,886 | Okulitch et al. | May 9, 1950 |
| 2,655,011 | Ihle et al. | Oct. 13, 1953 |
| 2,794,628 | Fessenden | June 4, 1957 |
| 2,799,485 | Silverman | July 16, 1957 |
| 2,844,363 | Clark | July 22, 1958 |
| 2,858,117 | Girton | Oct. 28, 1958 |
| 3,035,781 | Wallen | May 22, 1962 |

FOREIGN PATENTS

| | | |
|---|---|---|
| 49,102 | Netherlands | Aug. 15, 1940 |
| 747,764 | Great Britain | Apr. 11, 1956 |